United States Patent Office 3,363,434
Patented Jan. 16, 1968

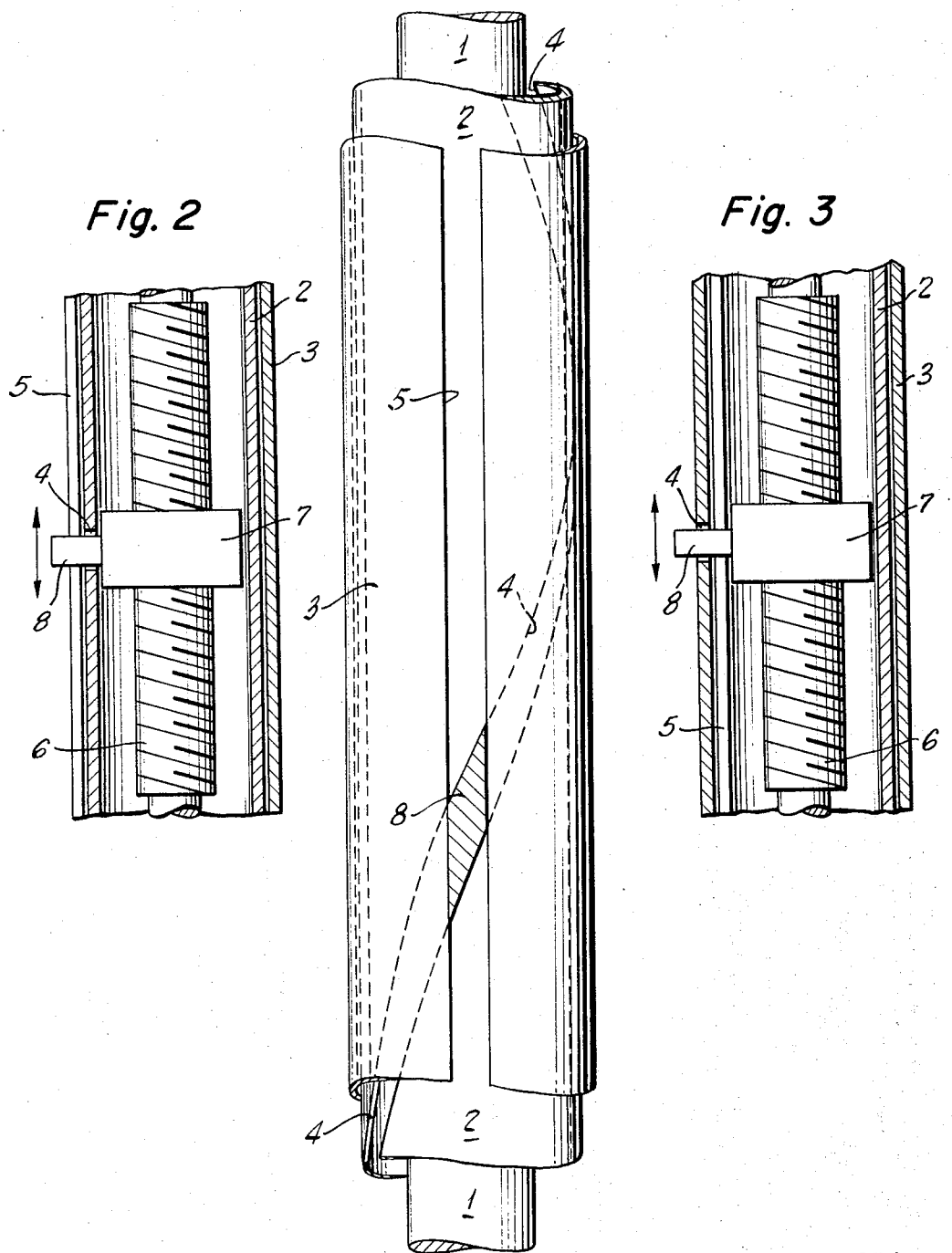

3,363,434
DEVICE FOR PROTECTING A SHAFT AGAINST CONDENSATION OF VAPOR
Gerhard Kühn and Wilfried Kunack, Dresden, Germany, assignors to Veb Lokomotivbau-Elektrotechnische Werke "Hans Beimler," Oranienburg, Germany
Filed Aug. 26, 1965, Ser. No. 482,778
3 Claims. (Cl. 64—3)

The invention relates to an arrangement for generally protecting a screw shaft against condensation of vapor thereon, especially drive male-screw shafts with driven female-screw nut used in vacuum or high vacuum plants, in which metal or other substances are melted, remelted or condensated.

It is generally known, to shield shafts against condensation of vapor by means of protective sheet metal of the plane or curved type. However, such a protection is not sufficient, since the condensated particles do not move rectilinearly, so that a vapor condensation on the shaft is possible despite shielding.

It is also known to employ protective pipes having longitudinal slits which are slipped over the shaft. These slits are necessary to provide a connection between the screw shaft and the part to be driven. Such an arrangement is disadvantageous, because the shaft is not protected in the slit area. Another arrangement is known, wherein a telescopic type pipe is slipped over the shaft, whereby the individual pipe pieces are slidable into one another. This arrangement proves to be disadvantageous in that the pipes tend to jam, due to the condensation of vapor, and due to the extremely long construction arrangement.

It is an object of the invention to protect screw shaft drives completely against vapor condensation or any other types of pollution.

It is another object of the invention to enclose a screw shaft completely, but to leave enough space so that the shaft nut may slide on the shaft, and to warrant a connection between shaft nut and the part to be driven.

According to the invention, two rotatable pipes encased with respect to each other are provided on the shaft wherein the outer pipe comprises a linear longitudinal slit along the horizontal axis thereof, and the inner pipe comprises a helical slit extending about the total length of the pipe substantially about 360° thereof. This slit arrangement can be arranged in reverse order, that is the outer pipe may be provided with the helical slit, and the inner pipe with the longitudinal slit.

The opening which forms at the intersection of the slits is so arranged that it moves always parallel along the axis of the shaft together with the shaft nut, so that the part which connects the shaft nut, and the driven part extends through the opening within the permissible tolerance, and practically closes the opening completely. The technical-economical result and especially the advance of the state of the art are based upon the fact that it is possible to protect a shaft completely against vapor condensation or any other type of pollution.

The various features of novelty which characterize the invention are pointed out with particularity in the claims annexed to, and forming a part of the specification. For a better understanding of the invention, its operating advantages and the specific objects attained by its use, reference should be had to the accompanying drawings and descriptive matter in which:

FIG. 1 is a diagrammatic showing of the arrangement according to the invention for protecting the screw shaft;

FIG. 2 shows the longitudinal section view of the protective arrangement in connection with screw shaft drive; and FIG. 3 is another modification of the arrangement according to FIG. 2 with interchanged protective pipes.

With reference to FIG. 1, it can be seen that two encased pipes 2 and 3 are rotatably arranged around drive screw 6 of a shaft 1. Inner pipe 2 is provided with a helical slit 4 along its longitudinal axis. Slit 4 is so arranged as to move in a 360° angle, when the inner pipe rotates around its axis. Outer pipe 3 comprises a slit 5 along its outer face and parallel to the axis of the shaft. A connecting portion 8 which connects the part to be driven with the shaft nut extends through the opening at the intersection of slits 4 and 5. It is also possible to arrange slits 4 and 5 in a reverse order, that is, inner pipe 2 may be provided with a longitudinal slit 5, and outer pipe 3 may be provided with a helical slit 4. In this case, the intersection opening could also move parallel with respect to the axis of the shaft. If the portion, which extends through the opening is toleranced according to the shape of the intersection opening, shaft 1 will be completely enclosed.

FIGURE 2 shows a longitudinal section through the protective arrangement of FIGURE 1. More specifically, FIGURE 2 shows the thread portion 6 of screw shaft 1 which is threadedly engaged by the screw nut 7 having a projecting portion 8. This projecting portion 8 extends through a helical slit 4 in inner tubular member or pipe 2 and a longitudinal slit 5 in outer tubular member or pipe 3.

FIGURE 3 illustrates the reverse arrangement. The tubular member 3 with the longitudinal slit 5 is provided on the inside and tubular member 2 with the helical slit 4 is provided on the outside.

This invention should not however be limited to the specific embodiments shown by the appended drawings, but rather defined by the scope of the appended claims.

What is claimed is:

1. An arrangement for protecting a screw shaft having a screw nut, which comprises: an inner and outer tubular member arranged coaxially with and surrounding said shaft, one of said tubular members having a longitudinal slit, the other having a helical slit, said slits defining an opening at their intersection, said screw nut having a projection for connection with a member to be driven, said projection extending through said opening and having substantially the same size and shape as said opening so as to substantially completely close the same thereby protecting said screw shaft against corrosive influences.

2. An arrangement according to claim 1, wherein said inner tubular member is provided with the helical slit, and said outer tubular member is provided with the longitudinal slit.

3. An arrangement according to claim 1, wherein said inner tubular member is provided with the longitudinal slit and said outer tubular member with the helical slit.

References Cited

UNITED STATES PATENTS

| | | | |
|---|---|---|---|
| 699,014 | 4/1902 | Rice | 64—24 |
| 1,629,252 | 5/1927 | Bouza | 64—24 |
| 2,791,909 | 5/1957 | Rick | 74—89.15 |

MILTON KAUFMAN, *Primary Examiner.*

HALL C. COE, *Examiner.*